United States Patent
Jeon et al.

(10) Patent No.: US 12,288,935 B2
(45) Date of Patent: Apr. 29, 2025

(54) ANTENNA MODULE AND ELECTRONIC DEVICE COMPRISING SAME

(71) Applicant: SAMSUNG ELECTRONICS CO., LTD., Suwon-si (KR)

(72) Inventors: Seunggil Jeon, Suwon-si (KR); Namwoo Kim, Suwon-si (KR); Junggil Kim, Suwon-si (KR); Hogon Park, Suwon-si (KR); Manho Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 201 days.

(21) Appl. No.: 18/086,353

(22) Filed: Dec. 21, 2022

(65) Prior Publication Data

US 2023/0119307 A1    Apr. 20, 2023

Related U.S. Application Data

(63) Continuation of application No. PCT/KR2021/007473, filed on Jun. 15, 2021.

(30) Foreign Application Priority Data

Jun. 29, 2020 (KR) .......... 10-2020-0079256

(51) Int. Cl.
*H01Q 1/24* (2006.01)
*H01Q 1/38* (2006.01)
*H01Q 21/28* (2006.01)

(52) U.S. Cl.
CPC .......... *H01Q 21/28* (2013.01); *H01Q 1/243* (2013.01); *H01Q 1/38* (2013.01)

(58) Field of Classification Search
CPC .......... H01Q 21/28; H01Q 1/243; H01Q 1/38; H01Q 5/378; H01Q 9/0414; H01Q 21/065;

(Continued)

(56) References Cited

U.S. PATENT DOCUMENTS 5,006,859 A * 4/1991 Wong .................. H01Q 9/0457
                                                    343/700 MS
5,576,718 A * 11/1996 Buralli ................. H01Q 21/065
                                                    343/700 MS (Continued)

FOREIGN PATENT DOCUMENTS

JP    2010286402 A    12/2010
JP    201592653 A     5/2015

(Continued)

OTHER PUBLICATIONS

Communication dated Oct. 25, 2023, issued by the European Patent Office in counterpart European Application No. 21833231.0.

(Continued)

*Primary Examiner* — David E Lotter
*Assistant Examiner* — Jordan E. DeWitt
(74) *Attorney, Agent, or Firm* — Sughrue Mion, PLLC

(57) ABSTRACT

An electronic device includes: a substrate; a first antenna element disposed on the substrate; a second antenna element disposed on the substrate and disposed to be spaced apart from the first antenna element; and a first auxiliary radiator disposed to be spaced apart from the first antenna element. In one embodiment of the present disclosure, a first distance between the second antenna element and the first auxiliary radiator is longer than a second distance between the first antenna element and the second antenna element, at least a portion of the first auxiliary radiator is overlapped with the first antenna element, when viewed from the first direction, and the first auxiliary radiator is electrically connected to the first antenna element.

11 Claims, 11 Drawing Sheets

(58) Field of Classification Search
CPC . H04M 1/0277; H04M 1/026; H04M 2201/38
See application file for complete search history.

(56) References Cited

U.S. PATENT DOCUMENTS

| | | | |
|---|---|---|---|
| 9,407,011 B2 | 8/2016 | Zaghloul et al. | |
| 9,444,147 B2 | 9/2016 | Zaghloul et al. | |
| 9,673,508 B2 | 6/2017 | Lee et al. | |
| 10,096,888 B2 | 10/2018 | Ahn et al. | |
| 10,660,198 B2 | 5/2020 | Woo | |
| 11,024,953 B2 | 6/2021 | Sato et al. | |
| 11,303,032 B2 | 4/2022 | Jo et al. | |
| 11,611,155 B2 | 3/2023 | Hiramatsu et al. | |
| 2002/0018019 A1* | 2/2002 | Fourdeux | H01Q 19/17 343/700 MS |
| 2005/0003828 A1* | 1/2005 | Sugar | H04W 24/00 455/422.1 |
| 2007/0273606 A1 | 11/2007 | Mak et al. | |
| 2009/0201211 A1* | 8/2009 | Saily | H01Q 1/246 343/702 |
| 2009/0322642 A1* | 12/2009 | Foo | H01Q 19/005 343/843 |
| 2010/0177012 A1* | 7/2010 | Morrow | H01Q 21/0025 343/893 |
| 2012/0154237 A1* | 6/2012 | Ying | H01Q 5/378 343/833 |
| 2013/0021207 A1 | 1/2013 | Lee | |
| 2013/0082730 A1* | 4/2013 | Castaneda | G01R 31/2834 324/762.01 |
| 2013/0271323 A1 | 10/2013 | Joo et al. | |
| 2014/0043197 A1 | 2/2014 | Lee et al. | |
| 2014/0062794 A1* | 3/2014 | Guo | H01Q 5/378 343/700 MS |
| 2014/0375510 A1 | 12/2014 | Lee et al. | |
| 2015/0091760 A1* | 4/2015 | Sawa | H01Q 5/385 343/700 MS |
| 2016/0261036 A1 | 9/2016 | Sato et al. | |
| 2016/0351998 A1 | 12/2016 | Ahn et al. | |
| 2018/0205134 A1* | 7/2018 | Khan | H01Q 5/314 |
| 2019/0036220 A1* | 1/2019 | Paulotto | H01Q 9/045 |
| 2019/0165470 A1* | 5/2019 | Jeon | H01Q 9/16 |
| 2019/0166686 A1 | 5/2019 | Jo et al. | |
| 2019/0379134 A1* | 12/2019 | Paulotto | H01Q 21/062 |
| 2020/0021037 A1* | 1/2020 | Wu | H01Q 9/0457 |
| 2020/0106183 A1* | 4/2020 | Fabrega Sanchez | H01Q 21/065 |
| 2020/0106192 A1* | 4/2020 | Avser | H01Q 1/405 |
| 2020/0176855 A1* | 6/2020 | Anguera | H01Q 5/378 |
| 2020/0212596 A1* | 7/2020 | Chen | H01Q 21/065 |
| 2020/0404454 A1* | 12/2020 | Ahn | G01R 33/07 |
| 2021/0168932 A1 | 6/2021 | Woo | |
| 2021/0313706 A1* | 10/2021 | Hiramatsu | H01Q 15/006 |
| 2022/0094048 A1* | 3/2022 | Wu | H01Q 9/0414 |
| 2022/0173790 A1* | 6/2022 | Lee | H01Q 3/2605 |
| 2022/0255229 A1* | 8/2022 | Jia | H01Q 5/385 |
| 2023/0019864 A1 | 1/2023 | Anguera et al. | |

FOREIGN PATENT DOCUMENTS

| | | |
|---|---|---|
| KR | 1020130117664 A | 10/2013 |
| KR | 1020140148006 A | 12/2014 |
| KR | 1020160139175 A | 12/2016 |
| KR | 1020190036438 A | 4/2019 |
| KR | 1020190060477 A | 6/2019 |
| KR | 1020190061936 A | 6/2019 |
| KR | 1020190062022 A | 6/2019 |
| WO | 2020/040259 A1 | 2/2020 |

OTHER PUBLICATIONS

International Search Report (ISA/210) dated Oct. 12, 2021, issued by the International Searching Authority for PCT/KR2021/007473.
International Written Opinion (ISA/237) dated Oct. 12, 2021, issued by the International Searching Authority for PCT/KR2021/007473.
Communication dated May 3, 2024, issued by the India Intellectual Property Office in Indian Patent Application No. 202317004111.
Communication dated May 23, 2024, issued by the Korean Intellectual Property Office in Korean Patent Application No. 10-2020-0079256.

* cited by examiner

ANTENNA MODULE AND ELECTRONIC DEVICE COMPRISING SAME

CROSS-REFERENCE TO RELATED APPLICATIONS

This application is a by-pass continuation application of International Application No. PCT/KR2021/007473, filed on Jun. 15, 2021, which based on and claims priority to Korean Patent Application No. 10-2020-0079256, filed on Jun. 29, 2020, in the Korean Intellectual Property Office, the disclosures of which are incorporated by reference herein in their entireties.

BACKGROUND

1. Field

One or more embodiments of the disclosure relate to an antenna module and an electronic device including the same.

2. Description of Related Art

As a mobile communication technology is developed, the electronic device including at least one antenna has been extensively spread. The electronic device may transmit and/or receive a radio frequency (RF) signal including a voice signal or data (e.g., a message, a photo, a moving picture, or a music file).

The antenna may simultaneously transmit or receive signals belonging to mutually different frequency bands by using a plurality of frequency bands. The electronic device may provide a service for a global communication band by using signals belonging to the mutually different frequency bands. For example, the electronic device may make communication (e.g., global positioning system (GPS); Legacy; Wifi 1) using a signal belonging to a lower frequency band (LB) and/or communication (e.g., Wifi 2) using a signal belonging to a higher frequency band (HB).

The electronic device may perform positioning based on an ultra-wideband (UWB) signal. For example, the UWB signal may have a frequency band of 500 MHz or more. The UWB has a pulse width less than a path delay, because of having a characteristic similar to that of an impulse signal. Accordingly, when the positioning is performed by using the UWB signal, a direct signal may be easily distinguished from a reflected signal. The electronic device may relatively exactly perform positioning (e.g., the error of less than 30 cm) by using at least one antenna, based on the characteristic of the UWB signal. The electronic device may perform positioning based on various positioning algorithms (e.g., angle of arrival (AoA), time difference of arrival (TDoA), time difference of arrival (AoD), time of arrival (ToA), time of flight (ToF), and/or two way ranging (TWR)).

As the size and/or the number of an electrical object, such as a camera and/or a speaker placed on the electronic device may be increased, and a bezel and a non-display area (e.g., Black Matrix (BM)) of a display may be decreased, a space (a gap) for implementing an antenna in the electronic device may be decreased. In this case, it is not easy to apply the antenna inside of the electronic device having a confined space.

For example, a plurality of antennas necessary for performing a positioning function based on the various positioning algorithms (e.g., AOA) may be disposed in the electronic device. The plurality of antennas may not be spaced apart from each other by a sufficient distance to be disposed, due to the insufficient mounting space of the electronic device. In this case, the spacing (the distance) between antennas may be reduced, which deteriorates the positioning performance.

SUMMARY

According to an embodiment of the disclosure, an electronic device includes: a first plate, a second plate facing a second direction opposite to the first direction, and a side member surrounding a gap between the first plate and the second plate and connecting one side of the first plate to one side of the second plate; a substrate disposed in opposition to the second plate; a first antenna element disposed on the substrate; a second antenna element disposed on the substrate and disposed to be spaced apart from the first antenna element in a third direction that is orthogonal to the first direction and the second direction; and a first auxiliary radiator disposed to be spaced apart from the first antenna element in the first direction and in the third direction. A first distance between the second antenna element and the first auxiliary radiator is longer than a second distance between the first antenna element and the second antenna element, at least a portion of the first auxiliary radiator is overlapped with the first antenna element, when viewed from the first direction, and the first auxiliary radiator is electrically connected to the first antenna element.

According to another aspect of the present disclosure, the electronic device further includes: a processor; and a memory operatively connected to the processor, wherein the memory stores one or more instructions that when executed, cause the processor to: transmit a positioning message to a positioning target by using the first antenna element and the second antenna element; receive a first response signal regarding the positioning message by using the first antenna element and receive a second response signal regarding the positioning message by using the second antenna element; and identify, based on the first response signal and the second response signal, a phase difference between the first response signal and the second signal received using the second antenna element, and identify a receiving angle of the first response signal and the second response signal.

According to another aspect of the present disclosure, an electronic device includes: a first plate facing a first direction, a second plate facing a second direction opposite to the first direction, and a side member surrounding a gap between the first plate and the second plate and connecting one side of the first plate to one side of the second plate; a substrate disposed in opposition to the second plate; a first antenna element disposed on the substrate; a second antenna element disposed on the substrate and the second antenna element disposed to be spaced apart from the first antenna element in a third direction that is orthogonal to the first direction and the second direction; a third antenna element disposed on the substrate and the third antenna element disposed to be spaced apart from the second antenna element in a fourth direction that is orthogonal to the first direction, the second direction, and the third direction; a first auxiliary radiator disposed to be spaced apart from the first antenna element in the first direction and the first auxiliary radiator disposed to be spaced apart from the first antenna element in the third direction; a second auxiliary radiator disposed to be spaced apart from the second antenna element in the first direction and the second auxiliary radiator disposed to be spaced apart from the second antenna element in a fifth direction opposite to the third direction; and a third auxiliary radiator disposed to be spaced apart from the third antenna element in the first direction and the third auxiliary radiator disposed to be spaced apart from the second antenna element in the fourth direction.

According to another aspect of the present disclosure, a method performed by an electronic device including a substrate, includes: providing a first antenna on the substrate; providing a second antenna on the substrate, the second antenna being spaced apart from the first antenna in X direction of X, Y, Z coordinates having X direction, Y direction, and Z direction; providing a first auxiliary radiator by stacking a portion of the first auxiliary radiator on the first antenna in Z direction to form a combined radiator in X direction, the first auxiliary radiator being electrically connected to the first antenna; and performing a measurement based on a first distance between a center of the combined radiator of the first auxiliary radiator and the first antenna and a center of the second antenna. The first distance is longer than a second distance between a center of the first antenna and a center of the second antenna.

According to one or more embodiments of the disclosure, an auxiliary radiator is stacked on an existing radiator inside the electronic device to ensure the additional spacing between the antennas, thereby improving the performance of the AOA measuring function. Besides, a variety of effects directly or indirectly understood through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components will be marked by the same or similar reference signs.

DETAILED DESCRIPTION

Hereinafter, one or more embodiments of the disclosure will described with reference to accompanying drawings. Accordingly, those of ordinary skill in the art will recognize that modification, equivalent, and/or alternative on the one or more embodiments described herein can be variously made without departing from the scope and spirit of the disclosure.

Figure 1:
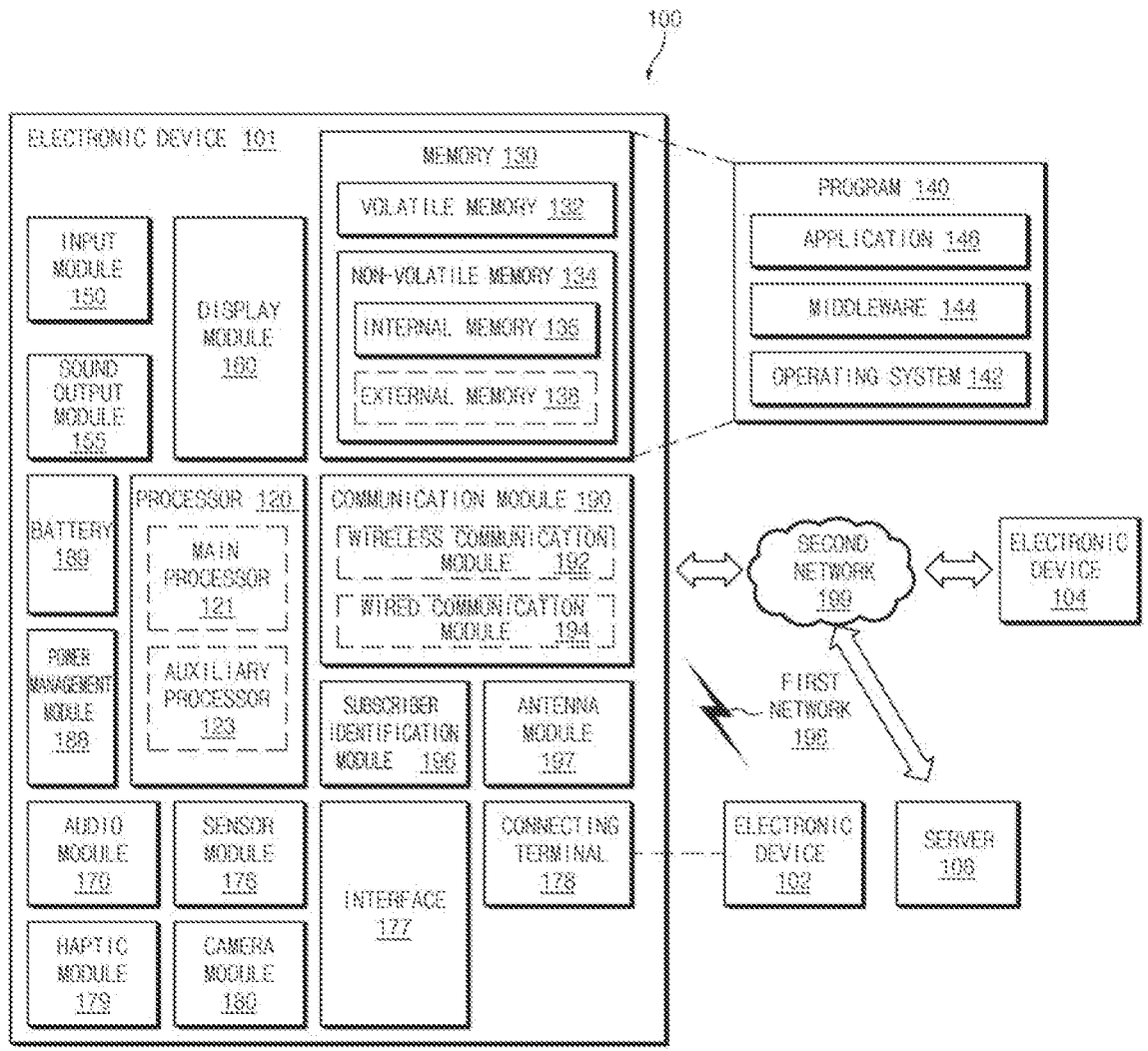
FIG. 1 is a block diagram of an electronic device in a network environment, according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or the antenna module 197. According to some embodiments, at least one (e.g., the connecting terminal 178) of the components may be omitted from the electronic device 101, or one or more other components may be added in the electronic device 101. According to some embodiments, some (e.g., the sensor module 176, the camera module 180, or the antenna module 197) of the components may be integrated into one component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume lower power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specified for processing an artificial intelligence (AI) model. The AI model may be generated through machine learning. The learning may be performed by the electronic device 101 performing the AI, and may be performed through an additional server (e.g., the server 108). A learning algorithm may include, for example, a supervised learning algorithm, an unsupervised learning algorithm, a semi-supervised learning algorithm, or a reinforcement learning algorithm, but the disclosure is not limited thereto. The AI model may include a plurality of artificial neural network (ANN) layers. The ANN may include a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks or the combination of the above networks, but the disclosure is not limited thereto. The AI model may additionally or alternatively include a software structure, in addition to a hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., the electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (WiFi) direct, or infrared data association (IrDA)) or the second network 199 (e.g., a long-range communication network, such as a legacy cellular network, 5G network, next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology, for example, a new radio (NR) access technology after a 4G network. The NR access technology may support high-speed transmission for high capacity data (enhanced mobile broadband; eMBB), terminal power minimizing and multiple terminal access (massive machine type communication; mMTC), or ultra-reliable and low-latency communications (URLLC). The wireless communication module 192 may support a high-frequency band (e.g., mmWave band) to achieve, for example, a higher data rate. The wireless communication module 192 may support various technologies, for example, beamforming, massive multiple-input and multiple-output (MIMO), Full-dimensional MIMO, an array antenna, analog beam-forming, or a large-scale antenna, to secure performance in high frequency bands. The wireless communication module 192 may support various requirements defined in the electronic device 101, the external electronic device (e.g., the electronic device 104) or the network system (e.g., the second network 199). According to one embodiment, the wireless communication module 192 may support a peak data rate (e.g., 20 Gbps or more) for eMBB realization, loss coverage (e.g., 164 dB or less) for mMTC realization, or U-plane latency (e.g., 0.5 ms or less, or the round trip of 1 ms or less in each of a downlink (DL) and an uplink (UL)) for URLCC realization.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., an array antenna). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., a bottom surface) of the printed circuit board, or disposed adjacent to the first surface to support the specific high frequency band (e.g., mmWave band), and a plurality of antennas (e.g., an array antenna) disposed on a second surface (e.g., a top surface or a side surface) of the printed circuit board or disposed adjacent to the second surface to transmit or receive a signal having the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-latency service by using, for example, distributed computing or mobile edge computing. According to various embodiments, the external electronic device 104 may include the Internet of things (IoT). The server 108 may be an artificial server using machine learning and/or a neural network. According to an embodiment, the external electronic device 104 or the server 108 may be included in the second network 199. The electronic device 101 may be applied to an artificial intelligence service (e.g., a smart home, a smart city, a smart car, or healthcare service) based on the 5G communication technology and the IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities and some of multiple entities may be separately disposed on the other components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
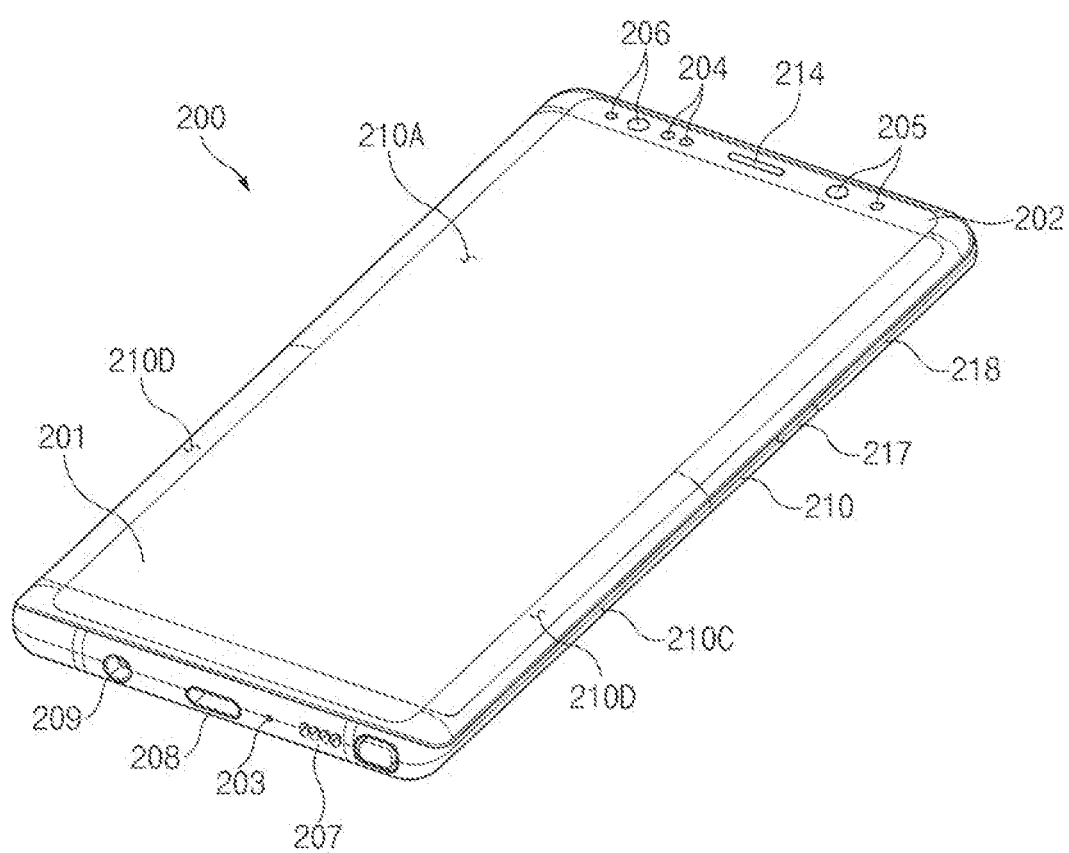
FIG. 2 illustrates a perspective view of a front surface of an electronic device, according to one or more embodiments.
Figure 3:
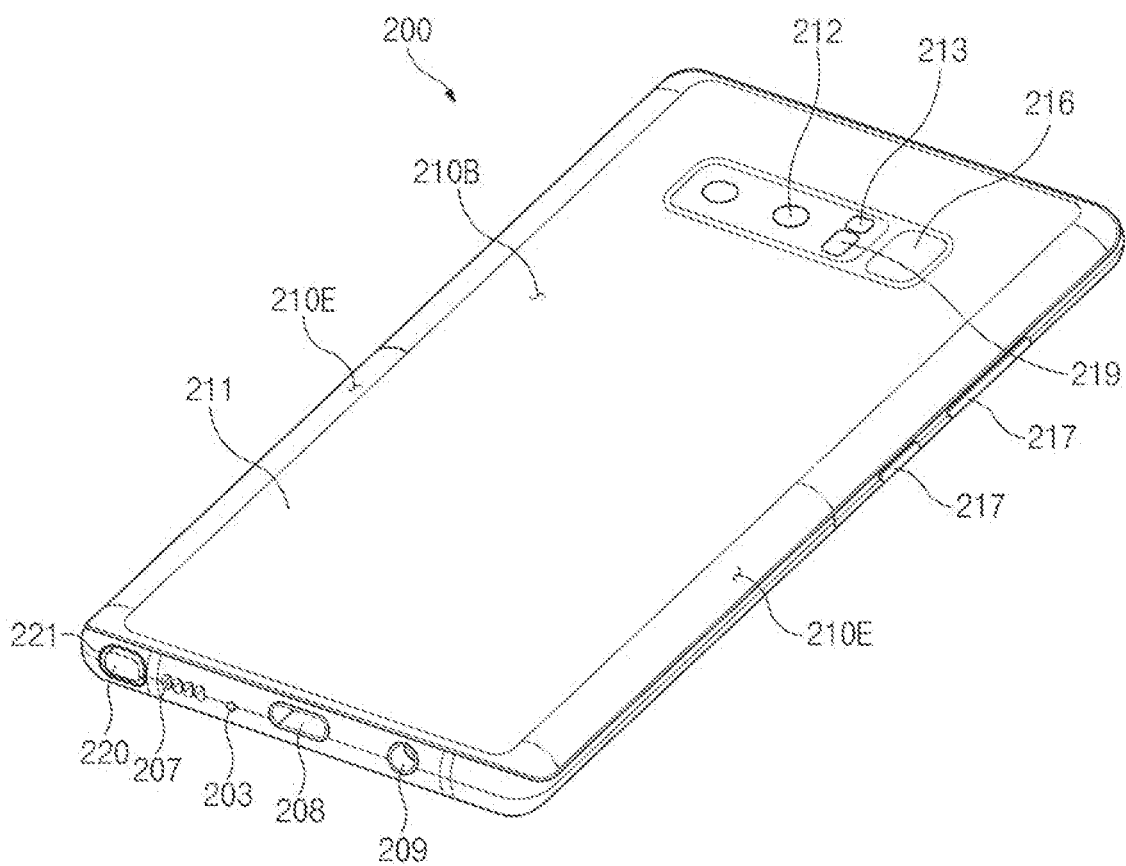
FIG. 3 illustrates a perspective view of a rear surface of an electronic device, according to one or more embodiments.

FIG. 2 is a perspective view illustrating a font surface of an electronic device 200 (e.g., the electronic device 101 of FIG. 1), according to an embodiment. FIG. 3 is a perspective view illustrating a rear surface of the electronic device 200 (e.g., the electronic device 101 of FIG. 1), according to an embodiment. Unless otherwise specified, the description about components having the same reference numerals in FIGS. 2 and 3 may make reference to the description made with reference to FIG. 2.

Referring to FIGS. 2 and 3, according to an embodiment, the electronic device 200 may include a housing 210 including a first surface (or a front surface) 210A, a second surface (or a rear surface) 210B, and a side surface 210C surrounding a space between the first surface 210A and the second surface 210B. According to another embodiment, the housing may be referred to as a "structure" that forms a portion of the first surface 210A, the second surface 210B, and the side surface 210C of FIG. 1. According to an embodiment, the first surface 210A may include a front plate 202 (e.g., a glass plate or a polymer plate including various coating layers) substantially transparent in at least a portion thereof. The second surface 210B may include a rear plate 211 substantially opaque. The rear plate 211 may include, for example, coating or colored glass, ceramic, polymer, metal (e.g., aluminum, stainless steel (STS), or magnesium) or the combination of at least two of the above materials. The side surface 210C may be connected to the front plate 202 and the rear plate 211, and may be formed by a side bezel structure (or a "side member") 218 including a metal and/or a polymer. According to an embodiment, the rear plate 211 and the side bezel structure 218 may be formed integrally with each other and may include the same material (e.g., a metal material such as aluminum).

According to an embodiment, the front plate 202 may include two first areas 210D which are bent toward the rear plate 211 from the first surface 210A while seamlessly extending and are formed at opposite long edge ends of the front plate 202. According to an embodiment illustrated (see FIG. 3), the rear plate 211 may include two second areas 210E which are bent from the second surface 210B toward the front plate 202 while seamlessly extending, and are formed at opposite long edge ends of the rear plate 211. According to an embodiment, the front plate 202 (or the rear plate 211) may include only one of the first areas 210D (or the second areas 210E). According to another embodiment, a portion of the first areas 210D or the second areas 210E may not be included. According to the embodiments, when viewed from a side surface of the electronic device 200, the side bezel structure 218 may have a first thickness (or width) at one side where the first areas 210D or the second areas 210E are not included, and may have a second thickness, which is thinner than the first thickness, at one side where the first areas 210D or the second areas 210E are included.

According to an embodiment, at least one antenna radiator (e.g., a conductive pattern) may be disposed at the side member (e.g., the side bezel structure 218 of FIG. 3) of the housing 210 of the electronic device 200, the two first areas 210D which are bent toward the rear plate 211 from the first surface 210A of the front plate 202 while seamlessly extending, or the two second areas 210E which are bent toward the front plate 202 from the second surface 210B of the rear plate 211 while seamlessly extending, According to an embodiment, at least one antenna radiator may radiate a signal in a specified frequency band. According to an embodiment, at least one antenna radiator may be an auxiliary radiator. For example, the at least one antenna radiator may radiate a signal, such as "n41", "n78", and/or "n79", in a 5G Sub-6 frequency band ranging from 3.5 GHz to about 6 GHz. According to an embodiment, the at least one antenna radiator may radiate a signal in a Wifi frequency band. The Wifi frequency band may include a frequency band such as frequency bands recommended in IEEE 802.11a and/or IEEE 802.11b.

According to an embodiment, at least one antenna radiator may be a main radiator. According to an embodiment, the frequency band radiated from the main radiator and the frequency band radiated from the auxiliary radiator are the same as each other in some frequency band portions, and differ from each other in remaining frequency band portions.

According to an embodiment, for another example, at least one antenna radiator may radiate a signal in an mmWave frequency band. For example, the mmWave frequency band may include a frequency band such as about 24 GHz to 34 GHz and/or about 37 to 44 GHz. For another example, the at least one antenna radiator may radiate a signal in an flay frequency band.

According to an embodiment, the electronic device 200 includes at least one a display 201 (e.g., the display module 160 of FIG. 1), audio modules (microphone hole 203, speaker holes 207 and 214) (e.g., the audio module 170 of FIG. 1), sensor modules 204, 216, and 219 (e.g., the sensor module 176 of FIG. 1), camera modules 205, 212, and 213 (e.g., the camera module 180 of FIG. 1), a key input device 217, a light emitting device 206, or connector holes 208 and 209. According to an embodiment, the electronic device 200 may not include at least one (e.g., the key input device 217 or the light emitting device 206) of the components or may further include any other component.

The display 201 may be exposed, for example, through a substantial portion of the front plate 202. According to an embodiment, at least a portion of the display 201 may be exposed through the front plate 202 including the first surface 210A and first areas 210D of the side surface 210C. According to an embodiment, the edge of the display 201 may be formed in the shape substantially identical to the shape of an outer portion adjacent to the front plate 202. According to another embodiment, to increase the area where the display 201 is exposed, the spacing between an outer portion of the display 201 and an outer portion of the front plate 202 may be formed substantially uniform.

According to another embodiment, a recess or an opening may be formed at a portion of a screen display region of the display 201, and at least one or more of the audio module 214, the sensor module 204, the camera module 205, and the light emitting device 206 may be provided to be aligned with the recess or the opening. According to another embodiment, at least one or more of the audio module 214, the sensor module 204, the camera module 205, the fingerprint sensor 216, and the light emitting device 206 may be provided on a rear surface of the display 201. According to another embodiment (the display 201 may be connected to a touch sensing circuit, a pressure sensor capable of measuring the intensity (or pressure) of a touch, and/or a digitizer capable of detecting a magnetic stylus pen or may be disposed adjacent thereto. According to an embodiment, at least some of the sensor modules 204 and 219 and/or at least some of key input device 217 may be disposed in the first areas 210D and/or the second areas 210E.

The audio modules may include the microphone hole 203 and the speaker holes 207 and 214. The microphone hole 203 may have a microphone disposed therein to obtain an external sound. According to an embodiment, the microphone hole 203 may have a plurality of microphones disposed therein to sense the direction of a sound. The speaker holes 207 and 214 may include the external speaker hole 207 and the receiver hole 214 for conversation. According to an embodiment, the speaker holes 207 and 214 and the microphone hole 203 may be implemented into one hole or a speaker may be included without the speaker holes 207 and 214 (e.g., a piezoelectric speaker).

The sensor modules 204, 216, and 219 may generate an electrical signal or a data value that corresponds to an internal operation state of the electronic device 200 or corresponds to an external environment state. The sensor modules 204, 216, and 219 may include, for example, the first sensor module 204 (e.g., a proximity sensor) and/or a second sensor module (e.g., a fingerprint sensor) disposed on the first surface 210A of the housing 210, and/or the third sensor module 219 (e.g., a hear rate monitor (HRM) sensor) and/or the fourth sensor module 216 (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include a sensor module such as at least one of a gesture sensor, a gyro sensor, an air pressure sensor, a magnetic sensor, an acceleration sensor, a grip sensor, a color sensor, an infrared sensor, a biometric sensor, a temperature sensor, a humidity sensor, or the illuminance sensor 204.

The camera modules 205, 212, and 213 may include the first camera device 205 disposed on the first surface 210A of the electronic device 200 and the second camera device 212 and/or the flash 213 disposed on the second surface 210B of the electronic device 200. The camera devices 205 and 212 may include one or a plurality of lenses, an image sensor, and/or an image signal processor. The flash 213 may include, for example, a light emitting diode or a xenon lamp. According to an embodiment, two or more lenses (an infrared camera lens, a wide angle lens, and a telephoto lens) and image sensors may be disposed on one side surface of the electronic device 200.

The key input device 217 may be disposed on the side surface 210C of the housing 210. According to another embodiment, the electronic device 200 may not include some or an entire portion of the key input device 217 and the some or the entire portion of the key input device 217 not included may be implemented in another form such as a soft key on the display 201. According to another embodiment, the key input device 217 may include the sensor module 216 disposed on the second surface 210B of the housing 210.

The light emitting device 206 may be, for example, disposed on the first surface 210A of the housing 210. The light emitting device 206 may provide, for example, the state information of the electronic device 200 in an optical form. According to another embodiment, the light emitting device 206 may provide, for example, a light source operating together with the operation of the camera module 205. The light emitting device 206 may include, for example, an LED, an IR LED, and a zenon lamp.

The connector holes 208 and 209 may include the first connector hole 208 to receive a connector (e.g., a USB connector) to transmit or receive power and/or data together with the external electronic device and the second connector hole (e.g., an ear-phone jack) 209 to receive a connector to transmit or receive an audio signal together with the external electronic device.

Figure 4:
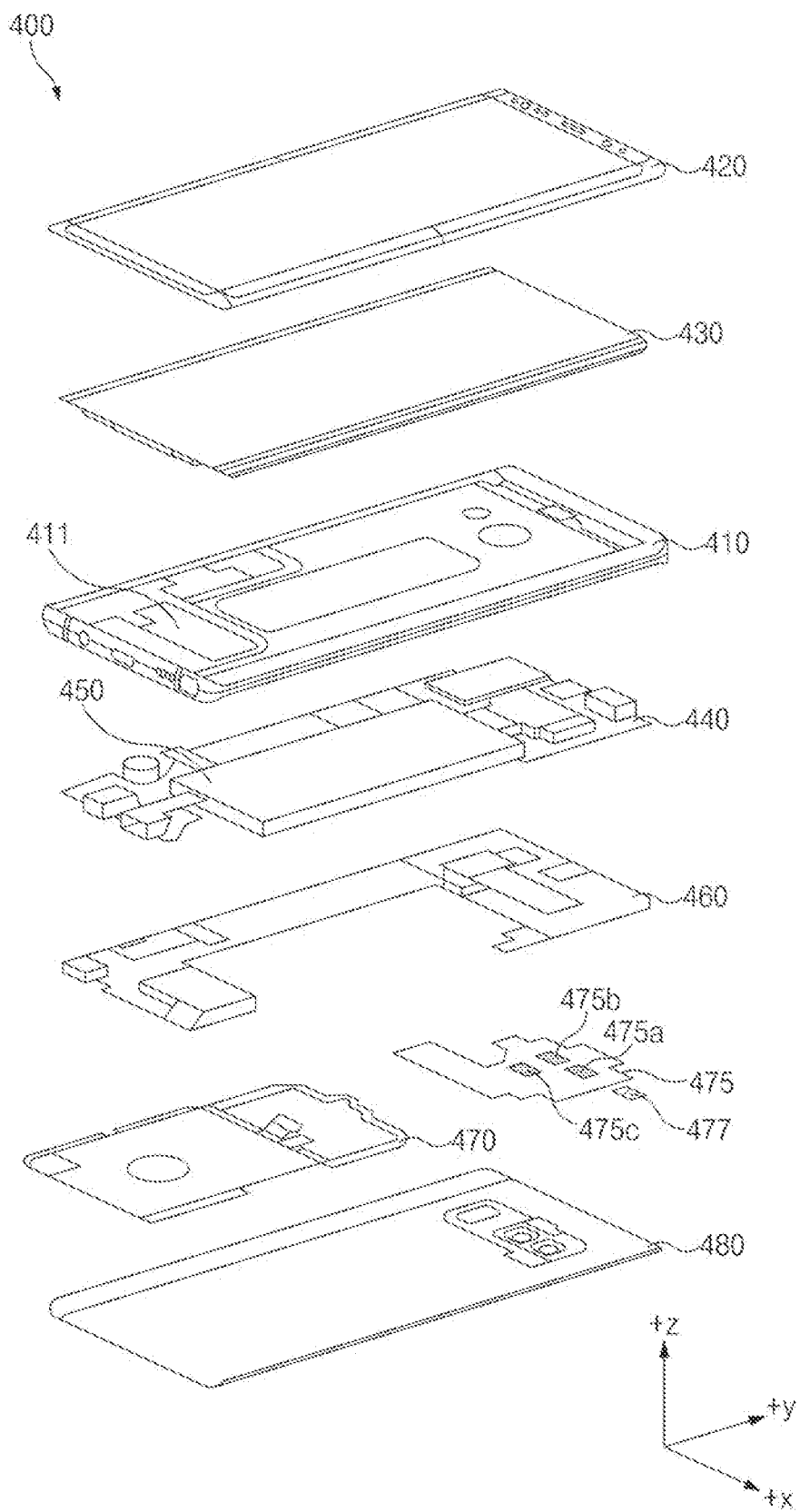
FIG. 4 illustrates an exploded perspective view of an electronic device, according to one or more embodiments.

FIG. 4 is an exploded perspective view 400 of an electronic device (e.g., the electronic device 200 of FIG. 2 and/or FIG. 3), according to an embodiment. Referring to FIG. 4, the electronic device 200 may include a side bezel structure 410 (e.g., the side bezel structure 218 in FIG. 2), a first support member 411 (e.g., a bracket), a front plate 420, a display 430 (e.g., the display 201 in FIG. 2), a PCB 440, a battery 450, a second support member 460 (e.g., a rear case), a short-range antenna 470, and a rear plate 480 (e.g., the rear plate 211 of FIG. 3). According to an embodiment, the electronic device 200 may not include at least one (e.g., the first support member 411 or the second support member 460) of the components or may further include any other component. At least one of components of the electronic device 200 may be identical to or similar to at least one of components of the electronic device 200 of FIG. 1, FIG. 2, and/or FIG. 3 and the duplication thereof will be omitted.

The first support member 411 may be disposed within the electronic device 200 and connected to the side bezel structure 410, or may be integrally formed with the side bezel structure 410. The first support member 411 may be formed of, for example, a metal material and/or a non-metal (e.g., polymer) material. The display 430 may be connected with one surface of the first support member 411, and the PCB 440 may be connected with an opposite surface of the first support member 411.

A processor (e.g., the processor 120 of FIG. 1), a memory (e.g., the memory 130 of FIG. 1), and/or an interface (e.g., the interface 177 of FIG. 1) may be disposed on the PCB 440. The processor 120 may include, for example, one or more of a central processing unit (CPU), an application processor (AP), a graphic processing unit (GPU), an image signal processor (ISP), a sensor hub processor (SHP), or a communication processor (CP). The memory may include, for example, a volatile memory and/or a non-volatile memory. The interface may include, for example, a high definition multimedia interface (HDMI), a universal serial bus (USB) interface, a secure digital (SD) card interface, and/or an audio interface. The interface may electrically or physically connect the electronic device 200 to an external electronic device (e.g., the electronic devices 102 and 104 of FIG. 1), and may include a USB connector, an SD card/MMC connector, or an audio connector.

The battery 450 that is a device for supplying a power to at least one component of the electronic device 200 and may include, for example, a primary cell incapable of being recharged, a secondary cell rechargeable, or a fuel cell. At least a part of the battery 450 may be disposed on substantially the same plane as the PCB 440, for example. The battery 450 may be integrally disposed within the electronic device 200 or may be disposed to be detachable from the electronic device 200.

The short-range antenna 470 may be interposed between the rear plate 480 and the battery 450. The short-range antenna 470 may include, for example, a near field communication (NFC) antenna, a wireless charging antenna, and/or a magnetic secure transmission (MST) antenna. For example, the short-range antenna 470 may perform short range communication with an external device or may wirelessly transmit/receive a power necessary to charge. In another embodiment, an antenna structure may be formed by a portion of the side bezel structure 410 and/or the first support member 411, or by a combination thereof.

A substrate 475 may be interposed in a housing (e.g., the housing 210 of FIG. 2) included in the electronic device 200. For example, the substrate 475 may be interposed between the rear plate 480 and the battery 450. According to an embodiment, the substrate 475 may include at least one antenna element (e.g., a first antenna element 475a, a second antenna element 475b, and a third antenna element 475c) to transmit and/or receive a radio frequency (RF) signal in a specific frequency band (e.g., the ultra-wide band (UWB)). For example, at least one of the plurality of antenna elements 475a, 475b, and 475c may be designed in the form of a patch antenna.

According to an embodiment, the plurality of antenna elements 475a, 475b, and 475c may be disposed on the substrate 475 in opposition to the rear plate 480. The antenna elements may be disposed to be spaced apart from each other by a specific distance. For example, the second antenna element 475b may be disposed on the substrate 475 in opposite to the rear plate 480 and may be disposed to be spaced from the first antenna element 475a in a third direction (e.g., −x axis) which is one direction perpendicular to a first direction (e.g., +z axis direction) and a second direction (e.g., −z axis direction). For another example, the third antenna element 475c may be disposed on the substrate 475 in opposition to the rear plate 480, and may be disposed to be spaced apart from the first antenna element 475a and the second antenna element 475b in a fourth direction (e.g., −y axis direction) which is one direction perpendicular to the first direction and the second direction. Although FIG. 4 illustrates that three antenna elements are disposed on the substrate 475, the disclosure is not limited thereto. For example, the substrate 475 may not include the third antenna element 475c.

According to an embodiment, the substrate 475 may further include an auxiliary radiator 477. For example, the auxiliary radiator 477 may be disposed to be spaced apart from the first antenna element 475a in the first direction, and may be disposed to be spaced apart from the first antenna element 475a in the third direction. For example, when viewed in the first direction, the spacing (a first distance) between the second antenna element 475b and the auxiliary radiator 477 may exceed (is longer than) the spacing (a second distance) between the first antenna element 475a and the second antenna element 475b.

For example, the spacing may refer to a physical distance calculated from geometric centers of the antenna element and the auxiliary radiator 477. For another example, the spacing may refer to an electrical distance between the antenna element and the auxiliary radiator 477. When viewed in the first direction, at least a portion of the auxiliary radiator 477 may be overlapped with one area of the first antenna element 475a. The auxiliary radiator 477 may be electrically connected to the first antenna element 475a. The description about the spacing between the plurality of antenna elements 475a, 475b, and 475c, and the auxiliary radiator 477 will be described in more detail below with reference to FIGS. 6 and 7.

Although FIG. 4 illustrates only the auxiliary radiator 477 mounted to correspond to the first antenna element 475a, the disclosure is not limited thereto. For example, the substrate 475 may further include an auxiliary radiator spaced apart from the second antenna element 475b in the first direction and disposed to be spaced apart from the second antenna element 475b in a fifth direction (e.g., −x axis) opposite to the third direction. For another example, the substrate 475 may further include an auxiliary radiator spaced apart from the third antenna element 475c in the first direction and spaced apart from the third antenna element 475c in the fifth direction. In this case, at least a portion of each auxiliary radiator may be overlapped with the second antenna element 475b and the third antenna element 475c when viewed in the first direction. The number, the size, and/or the mounting position of the auxiliary radiator 477 may be varied depending on the mounting environment of the electronic device 200, the size of a housing 610 and/or the substrate 475, the arrangement, addition, and/or omission of internal components of the housing. The structure of the substrate 475 including the plurality of antenna elements (e.g., the first antenna element 475a, the second antenna element 475b, and the third antenna element 475c) and/or the plurality of auxiliary radiators (e.g., the auxiliary radiator 477) will be described below with reference to FIG. 10.

According to an embodiment, the plurality of antenna elements 475a, 475b, and 475c may transmit a positioning signal (e.g., a poll message) and receive a signal (e.g., a response message) to the positioning signal. For example, the plurality of antenna elements 475a, 475b, and 475c may measure a distance to a positioning target and/or an angle of arrival (AoA) of the positioning target. The description about the measuring of the distance to the positioning target and/or the angle of arrival (AoA) of the positioning target by using the plurality of antenna elements 475a, 475b, and 475c will be described below with reference to FIG. 5.

Figure 5:
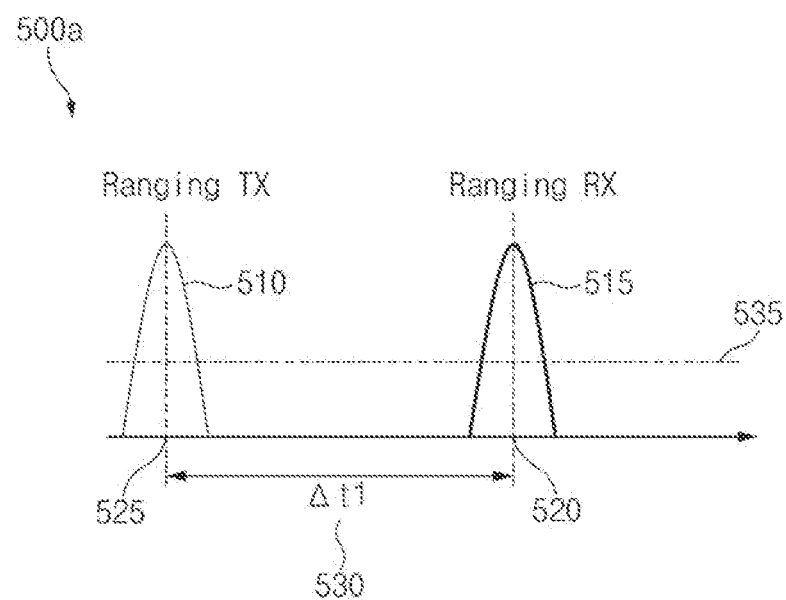
FIG. 5 illustrates positioning using an antenna of an electronic device, according to one or more embodiments.
Figure 5:
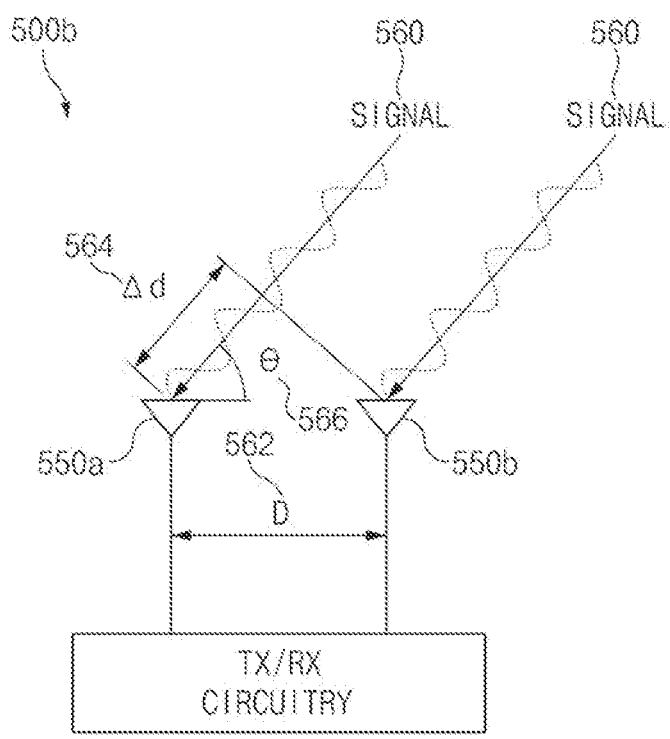

FIG. 5 illustrates positioning using an antenna of an electronic device, according to one or more embodiments. Reference numeral 500a of FIG. 5 illustrates measurement of a distance (ranging) of an electronic device (e.g., the electronic device 101 of FIG. 1). Reference numeral 500b of FIG. 5 illustrates a form in which a plurality of antenna elements (e.g., a first antenna element 550a and a second antenna element 550b) included in the electronic device measure an angle of arrival (AoA). The function of measuring the distance and the AoA of FIG. 5 may be performed by the processor (e.g., the processor 120 of FIG. 1).

Referring to reference numeral 500a, according to an embodiment, the processor may transmit a positioning signal (e.g., a poll message) 510 using an antenna. For example, the positioning signal 510 may include information (e.g., a time stamp) on a transmission time point of the positioning signal 510. According to an embodiment, the processor may receive a signal 515 (e.g., a response message) for the positioning signal 510 or in response to the positioning signal 510. For example, the signal 515 for the positioning signal 510 may refer to a signal obtained by reflecting the positioning signal 510 from a positioning object, or a response signal transmitted by an external object having the positioning signal 510 received therein. According to the disclosure, the 'signal for the positioning signal' may also be referred to as the "receive signal".

According to an embodiment, the processor may determine an arrival time point 520 of the receive signal 515. For example, the processor may set a threshold value 535 to find the arrival time point 520 of the receive signal 515. When the strength of the receive signal 515 exceeds the threshold value 535, the processor may detect a first path. Specifically, the processor may determine, as the first path, the peak of the strength of the receive signal 515 after the strength of the receive signal 515 exceeds the threshold value 535. The processor may determine the first path of the receive signal 515 by using the arrival time point 520 of the receive signal 515. The processor may calculate "Δt1" 530 which is the difference between the transmission time point 525 and the arrival time point 520 to measure the distance to the positioning target. For example, the measurement of the distance using "Δt1" 530 may be calculated through the following equation 1.

Measurement distance=(Δt1−latency time)*A/2    Equation 1

In Equation 1, a latency time may be understood as a time taken for the positioning target to receive the positioning signal 510 and to transmit (or carry) the signal 515 for the positioning signal 510. According to an embodiment, the receive signal 515 may include information on the latency time. In Equation 1, "A" may be understood as a constant for the speed of light or a propagation speed of a radio wave.

Referring to reference number 500b, the processor may use two or more antennas (e.g., the first antenna element 550a and the second antenna element 550b) to measure the AoA. The processor may receive a receive signal 560 (e.g., the receive signal 515 of reference numeral 500a) for the positioning signal using the plurality of antennas. The first antenna element 550a and the second antenna element 550b may be designed to be spaced apart from each other by spacing "D" 562 (e.g., second spacing). The information on the spacing "D" 562 may be stored in a memory (e.g., the memory 130 of FIG. 1) of the electronic device. For example, the spacing "D" 562 may refer to a physical distance between geometric centers calculated from one point corresponding to the geometric center of each first antenna element 550a and one point corresponding to the geometric center of the second antenna element 550b. For another example, the spacing "D" 562 may refer to the electrical spacing (distance) between antenna elements. The spacing "D" 562 for measuring the AoA may derive optimal measurement efficiency when the spacing "D" 562 has a length (e.g., 1/λ)) of half the wavelength (λ) of the signal. For example, an electronic device may derive the most efficient AoA measurement result, when the spacing "D" 562 is in the range of 15 mm to 18 mm which is provided only for the illustrative purpose, and the spacing "D" 562 may be varied depending on the mounting space of the electronic device and the performance of the antenna module. When the auxiliary radiator is additionally disposed in proximity to at least one of the plurality of antenna elements, the spacing "D" 562 may be differently calculated. The change in the spacing due to the addition of the auxiliary radiator may be described in more detail in FIG. 7, which will be described later. The time point when the first antenna element 550a receives the receive signal 560 and the time point when the second antenna element 550b receives the receive signal 560 may be different due to the spacing "D" 562 between the first antenna element 550a and the second antenna element 550b. The processor may measure "Δd" 564 using a difference between arrival time points of the receive signal 560 at the first antenna element 550a and the second antenna element 550b. The spacing "D" may be expressed through "Δd" 564 and "AoA(θ)" 566, as expressed in Equation 2. The phase difference "Δφ" of the signals received by the first antenna element 550a and the second antenna element 550b may be calculated using "Δd" 564, as expressed in Equation 3.

$D = \Delta d * \cos\theta$    Equation 2

$\Delta\varphi = 2\pi/\lambda * \Delta d$    Equation 3

The processor may calculate "AoA(θ)" 566 in the same manner as Equation 4 by calculating Equations 2 and 3.

$$AoA(\theta) = \cos^{-1}\left(\frac{\Delta\varphi}{2\pi D/\lambda}\right)$$ Equation 4

Figure 6:
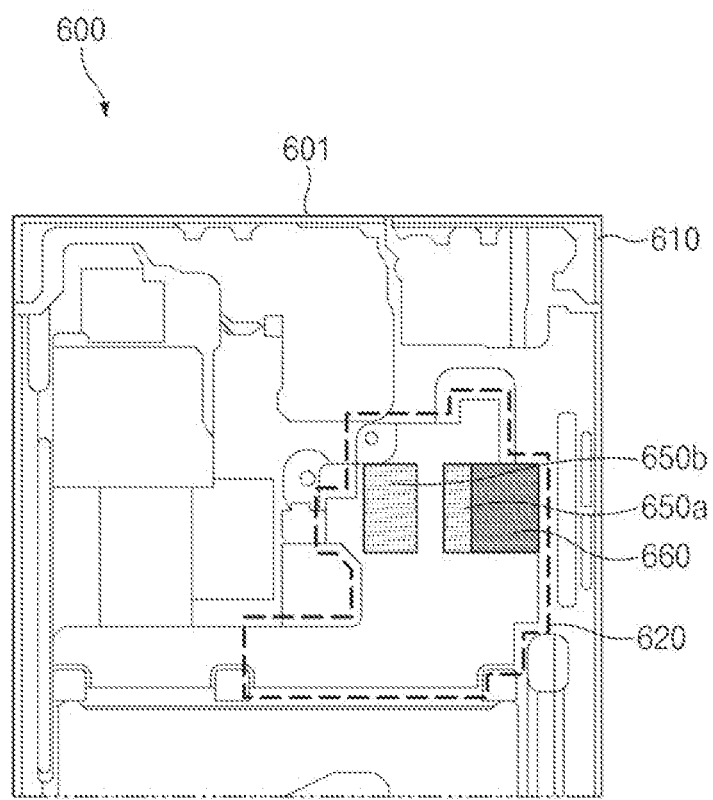
FIG. 6 illustrates a perspective view of an electronic device including an auxiliary radiator, according to one or more embodiments.

FIG. 6 illustrates a perspective view 600 of an electronic device 601 including an auxiliary radiator 660 according to one or more embodiments.

According to an embodiment, the electronic device 601 (e.g., the electronic device 101 of FIG. 1) may include a housing 610, a substrate 620, a first antenna element 650a, a second antenna element 650b, and an auxiliary radiator 660. According to one or more embodiments, the electronic device 601 may include another component (e.g., the third antenna element) in addition to the above-described components or may not include at least one of the above-described components.

According to an embodiment, the housing 610 may include a first plate (e.g., the front plate 420 of FIG. 4) facing a first direction (e.g., +z direction), a second plate (e.g., the rear plate 480 of FIG. 4) facing a second direction (e.g., -z direction) opposite to the first direction, and a side member (e.g., the side bezel structure 410) surrounding the space between the first plate and the second plate, connecting one side of the first plate to one side of the second plate, and including a conductive member.

According to an embodiment, the substrate 620 may be interposed between a rear plate (e.g., the rear plate 480 of FIG. 4) inside the housing 610 and a battery (e.g., the battery 450 of FIG. 4). The plurality of antenna elements (e.g., the first antenna element 650a and the second antenna element 650b) may be disposed on the first surface of the substrate 620. For example, the first surface of the substrate 620 may refer to one surface facing the first direction (e.g., +z axis direction).

According to an embodiment, the first antenna element 650a may be disposed on the substrate 620 in opposition to the rear plate. For example, the second antenna element 650b may be disposed on the substrate 620 in opposite to the rear plate and may be disposed to be spaced from the first antenna element 650a in the third direction (e.g., -x axis direction) which is one direction perpendicular to the first direction (e.g., +z axis direction) and the second direction (e.g., -z axis direction). Although FIG. 6 illustrates that two antenna elements are disposed on the substrate 620, the disclosure is not limited thereto. For example, the substrate 620 may further include a third antenna element. Specifically, the third antenna element may be disposed on the substrate 620 in opposition to the rear plate, and may be disposed to be spaced apart from the first antenna element 650a and the second antenna element 650b in a fourth direction (e.g., -y axis direction) which is one direction perpendicular to the first direction and the second direction. The structure of the substrate including the third antenna plate may be described below in more detail with reference to FIG. 10.

For example, the auxiliary radiator 660 may be disposed to be spaced apart from the first antenna element 650a in the first direction, and may be disposed to be spaced apart from the first antenna element 650a in the third direction. For example, when viewed in the first direction, a first spacing (e.g., in the range from 15 mm to 18 mm) corresponding to the spacing between the second antenna element 650b and the auxiliary radiator 660 may exceed a second spacing (e.g., 10 mm) between the first antenna element 650a and the second antenna element 650b. For example, the first spacing may be referred to as a distance between one point corresponding to the geometric center of the second antenna element 650b and one point corresponding to the geometric enter of the auxiliary radiator 660. The second spacing may be referred to a distance between one point corresponding to the geometric center of the first antenna element 650a and one point corresponding to the geometric center of the second antenna element 650b. When viewed in the first direction, at least a portion of the auxiliary radiator 660 may be overlapped with one area of the first antenna element 650a. The auxiliary radiator 660 may be electrically connected to the first antenna element 650a. The description about the spacing between the plurality of antenna elements, and the auxiliary radiator will be described in more detail below with reference to FIG. 7. Although the first spacing is in the range of 15 mm to 18 mm and the second spacing is 10 mm, first spacing or the second spacing may be varied depending on the mounting environment of the electronic device 601, the size of the housing 610 and/or the substrate 620, the arrangement, addition, and/or omission of internal components of the housing 610.

Figure 7:
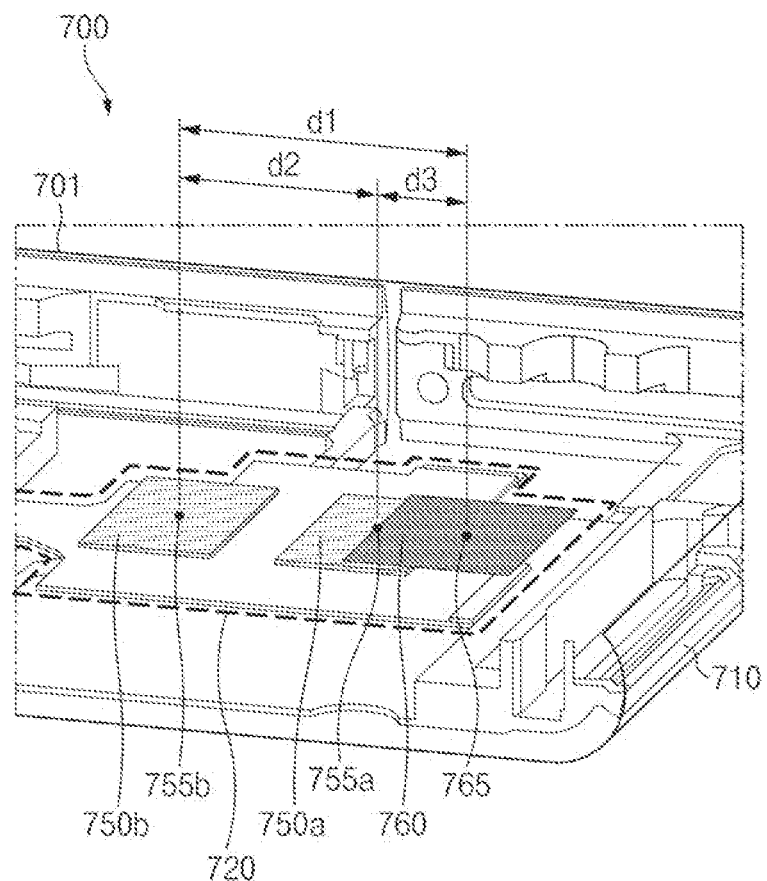
FIG. 7 illustrates a perspective view of an electronic device including an auxiliary radiator, according to one or more embodiments.

FIG. 7 illustrates a perspective view 700 of an electronic device including an auxiliary radiator 760 according to one or more embodiments.

According to an embodiment, an electronic device 701 (e.g., the electronic device 101 of FIG. 1) may include a housing 710, a substrate 720, a first antenna element 750a, a second antenna element 750b, and the auxiliary radiator 760. According to one or more embodiments, the electronic device 701 may include another component (e.g., the third antenna element) in addition to the above-described components or may not include at least one of the above-described components. The description of components, which correspond to the components of FIG. 6, of components of FIG. 7 may make reference to the description of the components of FIG. 6.

According to an embodiment, at least one area of the auxiliary radiator 760 may be overlapped with one area of the first antenna element 750a disposed on the substrate 720 included in the housing 710 when viewed from the first direction (e.g., the +z axis). For example, the auxiliary radiator 760 may be disposed to be spaced apart from the first antenna element 750a in the first direction, and may be disposed to be spaced apart from the first antenna element 750a in the third direction (e.g., the +x axis). The spacing between the components may be determined based on one points (e.g., a first point 755a, a second point 755b, and/or a third point 765) of a plurality of elements (e.g., the first antenna element 750a and the second antenna element 750b) and the auxiliary radiator 760. For example, the first point 755a, the second point 755b, and the third point 765 which are one points of the first antenna element 750a, the second antenna element 750b, and the auxiliary radiator 760, may refer to one points corresponding to the geometric centers of the first antenna element 750a, the second antenna element 750b, and the auxiliary radiator 760, respectively.

According to an embodiment, the antenna performance of the electronic device 701 may be improved due to the change in the spacing that is made as the auxiliary radiator 760 is additionally stacked. For example, when viewed from the first direction, the distance from the second point 755b, which is the geometric center of the second antenna element 750b, to the third point 765, which is the geometric center of the auxiliary radiator 760, may be referred to as the first spacing "d1". The distance from the first point 755a to the second point 755b, which is the geometric center of the second antenna element 750b, may be referred to as the second spacing "d2". For example, as the auxiliary radiator 760 is added, a third spacing "d3" corresponding to the distance from the first point 755a of the first antenna element 750a to the third point 765 of the auxiliary radiator 760 may be additionally ensured.

According to an embodiment, the first spacing "d1" may have a length value exceeding the second spacing "d2". For example, the first spacing "d1" may correspond to 15 mm to 18 mm, and the second spacing "d2" may correspond to 10 mm, respectively. Although the first spacing "d1" is in the range of 15 mm to 18 mm and the second spacing "d2" is 10 mm, the first spacing or the second spacing may be varied depending on the mounting environment of the electronic device 701, the size of the housing 710 and/or the size of the substrate 720, the arrangement, addition, and/or omission of internal components of the housing 610.

Hereinafter, stack structures 800 and 900 on which the auxiliary radiator is mounted will be described with reference to FIGS. 8 and 9. The description of the components (e.g., a substrate 810, an antenna element 815, a non-conductive member 830, a polymer plate 840, and a glass 850), which have the same name of the components illustrated in FIG. 8, of the components of FIG. 9 will make reference to the description of FIG. 8.

Figure 8:
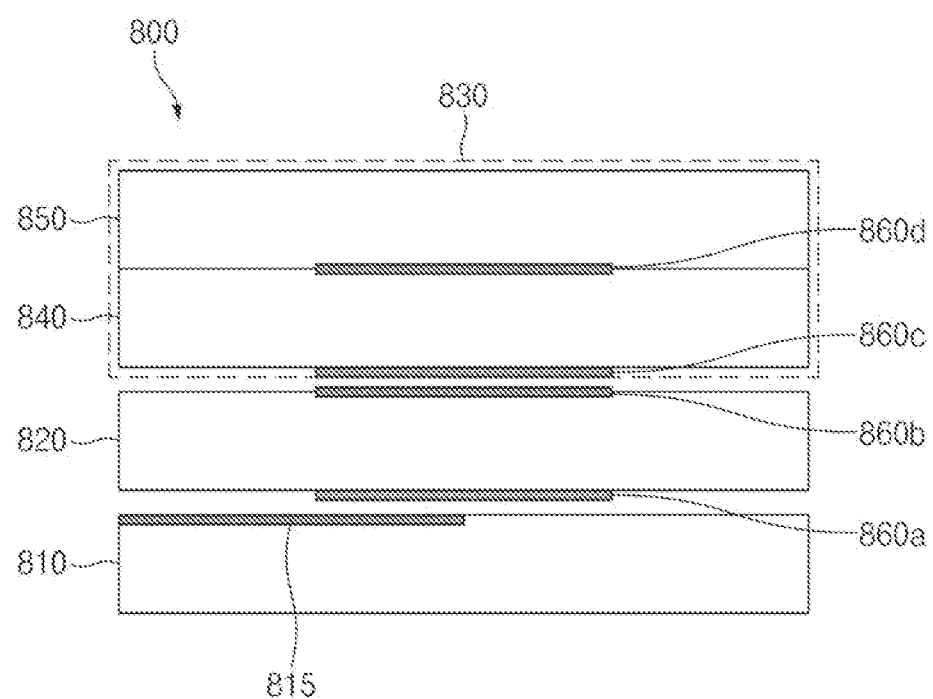
FIG. 8 illustrates a stack structure in which an auxiliary radiator is mounted, according to one or more embodiments.

FIG. 8 illustrates the stack structure 800, in which auxiliary radiators 860a, 860b, 860c, and 860d are mounted, according to one or more embodiments.

According to an embodiment, the stack structure 800 may include the substrate 810, the antenna element 815, a sponge 820, and/or the non-conductive member 830. The non-conductive member 830 may include various layers. The non-conductive member 830 may be divided into a polymer plate 840 and/or glass 850. For example, the non-conductive member 830 may be formed of coated or colored glass, ceramic, polymer, or the combination of at least two of the above materials.

According to an embodiment, the electronic device (e.g., the electronic device 101 in FIG. 1) may include a plurality of auxiliary radiators (e.g., the auxiliary radiators 860a, 860b, 860c, and 860d) mounted in the stack structure 800. For example, the auxiliary radiators 860a, 860b, 860c, and 860d may be mounted in the stack structure 800 disposed in a first direction (e.g., the first direction (+z axis) in FIG. 6) from at least one of a plurality of antenna elements 815 (e.g., the first antenna element 650a and/or the second antenna element 650b of FIG. 6) disposed on the substrate 810 (e.g., the substrate 620 in FIG. 6).

The auxiliary radiators 860a, 860b, 860c, and 860d may be interposed between components in the stack structure 800. According to an embodiment, the auxiliary radiators 860a, 860b, 860c, and 860d may be substituted with a conductive pattern formed on at least one surface of the components in the stack structure 800. Accordingly, the conductive pattern may operate as an antenna radiator. For example, the conductive pattern may operate as an antenna radiator which transmits and/or receives RF signals in a frequency band including an ultra-wide band to be substantially the same or similar to the antenna element 815. For example, the conductive pattern may be formed of laser direct structuring (LDS). For another example, the conductive pattern may be disposed on a flexible printed circuit board (FPCB). The conductive pattern disposed on the FPCB will be described in more detail with reference to FIG. 9 to be described later.

Figure 9:
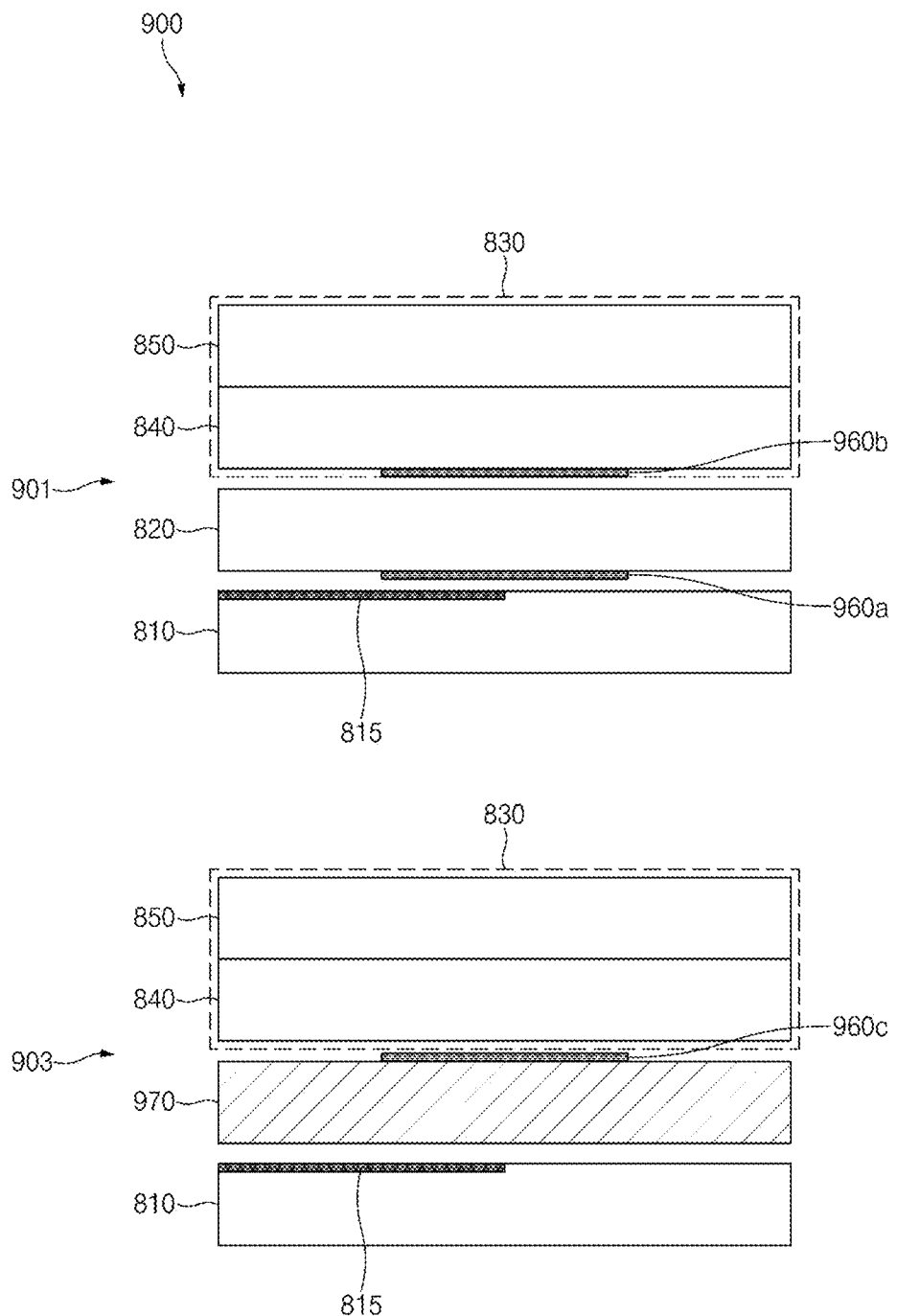
FIG. 9 illustrates a stack structure in which an auxiliary radiator is mounted, according to one or more embodiments.

FIG. 9 illustrates a stack structure 900 in which an auxiliary radiator is mounted, according to one or more embodiments.

According to an embodiment, stack structures 901 and 903 may include the substrate 810, the antenna element 815, the sponge 820, the non-conductive member 830, and/or a polycarbonate (PC) film 970. The non-conductive member 830 may include various layers. The non-conductive member 830 may be divided into the polymer plate 840 and/or the glass 850. For example, the non-conductive member 830 may be formed of coated or colored glass, ceramic, polymer, or the combination of at least two of the above materials.

Referring to the first stack structure 901 and the second stack structure 903, the electronic device (e.g., the electronic device 101 in FIG. 1) may include conductive patterns (e.g., 960a, 960b, and/or 960c) disposed on the FPCB.

Referring to the first stack structure 901, the auxiliary radiators 960a and 960b may be disposed on the non-conductive member 830. For example, the auxiliary radiators 960a and 960b may be substituted with a conductive pattern formed on at least one surface of the components (e.g., the polymer plate 840 and/or the sponge 820) in the first stack structure 901. Accordingly, the conductive pattern may operate as an antenna radiator. For example, the conductive pattern 960a and/or 960b may be disposed on the FPCB.

Referring to the second stack structure 903, the auxiliary radiator 960c may be disposed on the polycarbonate (PC) film 970. For example, the auxiliary radiator 960c may be substituted with a conductive pattern formed on at least one surface of the components in the second stack structure 903. Accordingly, the conductive pattern may operate as an antenna radiator. For example, the conductive pattern may be disposed on the FPCB.

Figure 10:
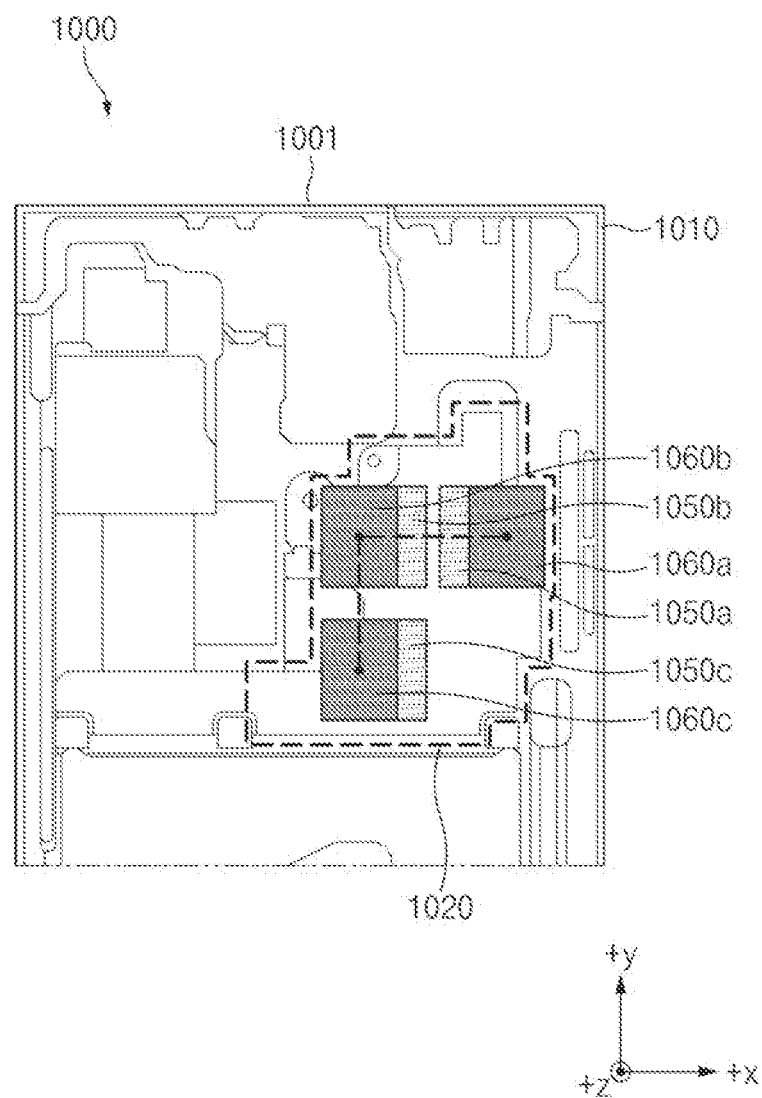
FIG. 10 illustrates a perspective view of an electronic device including an auxiliary radiator, according to one or more embodiments.

FIG. 10 illustrates a perspective view 1000 of an electronic device including an auxiliary radiator according to one or more embodiments.

According to an embodiment, an electronic device 1001 (e.g., the electronic device 101 in FIG. 1) may include a plurality of auxiliary radiators (e.g., a first auxiliary radiator 1060a, a second auxiliary radiator 1060b, and/or a third auxiliary radiator 1060c). FIG. 6 illustrates an electronic device (e.g., the electronic device 601 of FIG. 6) including one auxiliary radiator (e.g., the auxiliary radiator 660 of FIG. 6), so the same description will be omitted.

The electronic device 1001 may further include a third antenna element 1050c in addition to a first antenna element 1050a and a second antenna element 1050b. The third antenna element 1050c may be disposed on a substrate 1020 (e.g., the substrate 620 of FIG. 6) included in a housing 1010 of the electronic device 1001 facing the rear plate. For example, the third antenna element 1050c may be disposed to be spaced apart from the second antenna element 1050b in the fourth direction (e.g., −y axis), which is perpendicular to the first direction (e.g., the +z axis), the second direction (e.g., the −x axis), and the third direction (e.g., +x axis)

According to an embodiment, the electronic device 1001 may further include the second auxiliary radiator 1060b. For example, the second auxiliary radiator 1060b may be disposed to be spaced apart from the second antenna element 1050b in the first direction, and may be disposed to be spaced apart from the second antenna element 1050b in the fifth direction (e.g., −x axis) opposite to the third direction. When viewed in the first direction, at least a portion of the second auxiliary radiator 1060b may be overlapped with one area of the second antenna element 1050b.

According to an embodiment, the electronic device 1001 may further include the third auxiliary radiator 1060c. For example, the third auxiliary radiator 1060c may be disposed to be spaced apart from the third antenna element 1050c in the first direction, and may be disposed to be spaced apart from the second antenna element 1050*b* in the fourth direction. When viewed in the first direction, at least a portion of the third auxiliary radiator 1060*c* may be overlapped with one area of the third antenna element 1050*c*.

According to an embodiment, as the plurality of auxiliary radiators 1060*a*, 1060*b*, and 1060*c* are added, the electronic device 1001 may perform positioning based a wider spacing. For example, the distance from one point (e.g., the third point 765 of FIG. 7) corresponding to the geometric center of the first auxiliary radiator 1060*a* to one point (e.g., the first point 755*a* of FIG. 7) corresponding to the geometric center of the first antenna element 1050*a* may be additionally ensured. For another example, the distance from one point corresponding to the geometric center of the second auxiliary radiator 1060*b* to one point (e.g., the second point 755*b* of FIG. 2) corresponding to the geometric center of the second antenna element 1050*b* may be additionally ensured. As the second auxiliary radiator 1060*b* is added, the central axis of the first antenna element 1050*a* and the central axis of the third antenna element 1050*c* may be changed. To correct the changed central axes, the electronic device 1001 may further include the third auxiliary radiator 1060*c*.

Although FIG. 10 illustrates that the electronic device 1001 includes the first auxiliary radiator 1060*a*, the second auxiliary radiator 1060*b*, and the third auxiliary radiator 1060*c*, the disclosure is not limited thereto. For example, the electronic device 1001 may not include at least one of the first auxiliary radiator 1060*a*, the second auxiliary radiator 1060*b*, or the third auxiliary radiator 1060*c*.

Figure 11:
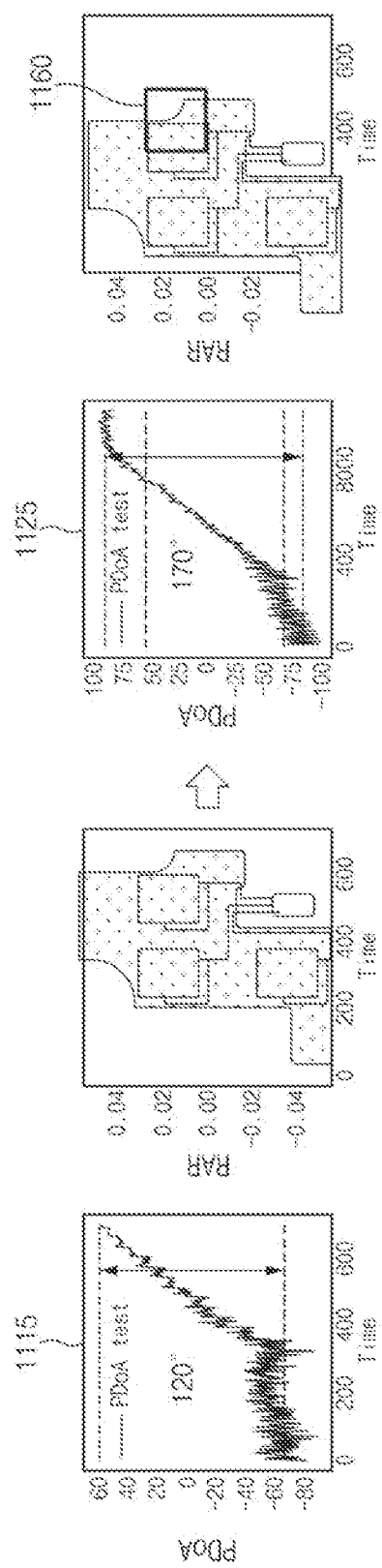
FIG. 11 illustrates the change in performance of an antenna as an auxiliary radiator is added, according to one or more embodiments.

FIG. 11 is a graph illustrating the change in performance of an antenna as an auxiliary radiator 1160 is added, according to one or more embodiments.

Reference numerals 1115 and 1125 illustrate graphs illustrating antenna performance before and after the auxiliary radiator 1160 (e.g., auxiliary radiator 660 in FIG. 6) is added, respectively.

In graph 1 (see reference numeral 1115) and graph 2 (see reference numeral 1125), a y axis may correspond to a phase difference of an arriving signal (PDoA), and an x axis may correspond to a time.

According to an embodiment, the processor (e.g., the processor 120 of FIG. 1) may calculate an AOA by processing PDoA obtained using a plurality of antennas. When the electronic device further includes the auxiliary radiator 1160, the PDoA and the AoA obtained by the electronic device may have clearer linearity over time. For example, the section in graph 1 (1115), in which an x axis value is in the range −90 to 0, PDoA, may have clearer linearity as compared to the same section in graph 2. In other words, as the auxiliary radiator 1160 is added, the electronic device may implement an improved antenna function in a specific section.

According to various embodiment of the disclosure, an electronic device may include a housing (e.g., the housing 210 of FIG. 2) including a first plate (e.g., the front plate 420 of FIG. 4) facing a first direction (e.g., the +z axis direction), a second plate (e.g., the rear plate of FIG. 4) facing a second direction (e.g., the −z axis direction of FIG. 4) opposite to the first direction, and a side member (e.g., the side bezel structure 410 of FIG. 4) surrounding a space between the first plate and the second plate, connecting one side of the first plate to one side of the second plate, and including a conductive member, a display (e.g., the display 201 of FIG. 2) exposed through at least a portion of the first plate, a substrate (e.g., the substrate 475 of FIG. 4) disposed in the housing, a first antenna element (e.g., the first antenna element 475*a* of FIG. 4) disposed on the substrate in opposition to the second plate, a second antenna element (e.g., the second antenna element 475*b* of FIG. 4) disposed on the substrate in opposition to the second plate and disposed to be spaced apart from the first antenna element in a third direction (e.g., the −x axis direction of FIG. 4) which is one direction orthogonal to the first direction and the second direction, and a first auxiliary radiator (e.g., the auxiliary radiator 477 of FIG. 4) disposed to be spaced apart from the first antenna element in the first direction and spaced from the first antenna element in the third direction.

According to an embodiment, a first spacing corresponding to a spacing between the second antenna element and the first auxiliary radiator may exceed a second spacing corresponding to a spacing between the first antenna element and the second antenna element, at least a portion of the first auxiliary radiator may be overlapped with one area of the first antenna element, and the first auxiliary radiator may be electrically connected to the first antenna element, when viewed from in the first direction.

According to an embodiment, the electronic device may further include a third antenna element disposed on the substrate in opposition to the second plate. The third antenna element may be disposed to be spaced apart from the second antenna element in a fourth direction which is one direction orthogonal to the first direction, the second direction, and the third direction According to an embodiment, the electronic device may further include a second auxiliary radiator disposed to be spaced apart from the second antenna element in the first direction and spaced apart from the second antenna element in a fifth direction which is a direction opposite to the third direction. At least a portion of the second auxiliary radiator may be overlapped with one area of the second antenna element, when viewed from in the first direction.

According to an embodiment, the electronic device may further include a third auxiliary radiator disposed to be spaced apart from the third antenna element in the first direction and spaced apart from the second antenna element in the fourth direction. At least a portion of the third auxiliary radiator may be overlapped with one area of the third antenna element, when viewed from in the first direction.

According to an embodiment, the electronic device may further include a processor, and a memory operatively connected to the processor. The memory may store one or more instructions that when executed, cause the processor to receive a signal for a positioning signal by using the first antenna element and the second antenna element, identify a phase difference between a first signal received using the first antenna element and a second signal received using the second antenna element, and receiving angles of the first signal and the second signal.

According to an embodiment, the one or more instructions may when executed, cause the processor to measure a distance to a positioning target, by using the phase difference between the first signal and the second signal, the receiving angles of the first signal and the second signal, which are identified, and the first spacing.

According to an embodiment, the one or more instructions may when executed, cause the processor to measure an angle of arrival (AoA) with respect to a positioning target, by using the phase difference between the first signal and the second signal, and the receiving angles of the first signal and the second signal, which are identified, and the first spacing.

According to an embodiment, the first auxiliary radiator may be disposed on at least one surface of components included in a stack structure disposed to be spaced apart from the first antenna element in the first direction, and the stack structure may include at least one a non-conductive member, a sponge, or a polycarbonate (PC) film.

According to an embodiment, the non-conductive member may be classified into back glass and polymer plate.

According to an embodiment, the first auxiliary radiator may correspond to a conductive pattern formed on at least one surface of the stack structure, and the at least one surface of the stack structure may include at least one of a first surface between the back glass and a polymer plate, a second surface facing the second direction on the polymer plate, a third surface facing the first direction on the sponge, or a fourth surface facing the second direction on the sponge.

According to an embodiment, the conductive pattern may be formed of laser direct structuring (LDS).

According to an embodiment, the conductive pattern may be disposed on a flexible printed circuit board (FPCB).

According to an embodiment, the conductive pattern may be included in the stack structure, and formed on one surface, which faces the first direction, of a the PC film disposed to be spaced apart in the second direction from the non-conductive member.

According to an embodiment, each of the second auxiliary radiator and the third auxiliary radiator may be disposed on at least one surface of components included in a stack structure disposed to be spaced apart in the first direction from the second antenna element and the third antenna element, respectively, and the stack structure may include at least one a non-conductive member, a sponge, or a polycarbonate (PC) film.

According to an embodiment, the first spacing may be in the range of 15 mm to 18 mm, and the second spacing may be 10 mm.

According to one or more embodiments of the disclosure, an electronic device a housing including a first plate facing a first direction, a second plate facing a second direction opposite to the first direction, and a side member surrounding a space between the first plate and the second plate, connecting one side of the first plate to one side of the second plate, and including a conductive member, a display exposed through at least a portion of the first plate, a substrate disposed in the housing, a first antenna element disposed on the substrate in opposition to the second plate, a second antenna element disposed on the substrate in opposition to the second plate and disposed to be spaced apart from the first antenna element in a third direction which is one direction orthogonal to the first direction and the second direction, a second third antenna element disposed on the substrate in opposition to the second plate and disposed to be spaced apart from the second antenna element in a fourth direction which is one direction orthogonal to the first direction, the second direction, and the third direction, a first auxiliary radiator disposed to be spaced apart from the first antenna element in the first direction and spaced apart from the first antenna element in the third direction, a second auxiliary radiator disposed to be spaced apart from the second antenna element in the first direction and spaced apart from the second antenna element in a fifth direction opposite to the third direction, and a third auxiliary radiator disposed to be spaced apart from the third antenna element in the first direction and spaced apart from the second antenna element in the fourth direction.

According to an embodiment, at least a portion of the first auxiliary radiator, at least a portion of the second auxiliary radiator, and at least a portion of the third auxiliary radiator are overlapped with one area of the first antenna element, one area of the second antenna element, and one area of the third antenna element, respectively, when viewed from in the first direction.

According to an embodiment, the first auxiliary radiator, the second auxiliary radiator, and the third auxiliary radiator are electrically connected to the first antenna element, the second antenna element, and the third antenna element, respectively.

According to an embodiment, when viewed from the first direction, a first spacing corresponding to a spacing between one point corresponding to a geometric center of the second antenna element and the first auxiliary radiator may be in the range of 15 mm to 18 mm.

According to an embodiment, the first auxiliary radiator, the second auxiliary radiator, and the third auxiliary radiator may be disposed on at least one surfaces of components, which are included in a stack structure, disposed to be spaced apart in the first direction from the first antenna element, the second antenna element, and the third antenna element, respectively, and the stack structure may include at least one a non-conductive member, a sponge, or a polycarbonate (PC) film.

According to an embodiment, a method performed by an electronic device including a substrate, includes: providing a first antenna on the substrate; providing a second antenna on the substrate, the second antenna being spaced apart from the first antenna in X direction of X, Y, Z coordinates having X direction, Y direction, and Z direction; providing a first auxiliary radiator by stacking a portion of the first auxiliary radiator on the first antenna in Z direction to form a combined radiator in X direction, the first auxiliary radiator being electrically connected to the first antenna; and performing a measurement based on a first distance between a center of the combined radiator of the first auxiliary radiator and the first antenna and a center of the second antenna. The first distance is longer than a second distance between a center of the first antenna and a center of the second antenna.

According to an embodiment, the first distance is a physical distance, the center of the combined radiator of the first auxiliary radiator and the first antenna is a geometric center of the combined radiator of the first auxiliary radiator and the first antenna, and the center of the second antenna is a geometric center of the second antenna.

According to an embodiment, the first distance is an electric distance, the center of the combined radiator of the first auxiliary radiator and the first antenna is an electric center of the combined radiator of the first auxiliary radiator and the first antenna, and the center of the second antenna is an electric center of the second antenna.

According to an embodiment, wherein the measurement is an Angle of Arrival (AoA) of signals received by the first antenna and the second antenna.

According to an embodiment, further comprising providing a second auxiliary radiator being electrically connected to the first auxiliary radiator, the second auxiliary radiator forming another combined radiator with the first auxiliary radiator and the first antenna.

What is claimed is:

1. An electronic device comprising:
   a first plate facing a first direction,
   a second plate facing a second direction opposite to the first direction, and
   a side member surrounding a gap between the first plate and the second plate and connecting one side of the first plate to one side of the second plate;
   a substrate disposed in opposition to the second plate;
   a first antenna element disposed on the substrate;

a second antenna element disposed on the substrate and disposed to be spaced apart from the first antenna element in a fifth direction opposite to a third direction that is orthogonal to the first direction and the second direction; and a first auxiliary radiator disposed to be spaced apart from the first antenna element in the first direction and in the third direction, wherein a first distance between the second antenna element and the first auxiliary radiator is longer than a second distance between the first antenna element and the second antenna element, wherein a portion of the first auxiliary radiator is overlapped with the first antenna element, when viewed from the first direction, wherein the first distance is set for positioning based on a phase difference between signals received by the first antenna element and the second antenna element, and wherein the first auxiliary radiator is electromagnetically connected to the first antenna element.

2. The electronic device of claim 1, further comprising a third antenna element disposed on the substrate and disposed to be spaced apart from the second antenna element in a fourth direction that is orthogonal to the first direction, the second direction, and the third direction.

3. The electronic device of claim 2, further comprising:
a second auxiliary radiator disposed to be spaced apart from the second antenna element in the first direction and disposed to be spaced apart from the second antenna element in the fifth direction, wherein at least a portion of the second auxiliary radiator is overlapped with the second antenna element, when viewed from in the first direction.

4. The electronic device of claim 3, further comprising:
a third auxiliary radiator disposed to be spaced apart from the third antenna element in the first direction and disposed to be spaced apart from the second antenna element in the fourth direction, wherein at least a portion of the third auxiliary radiator is overlapped with the third antenna element, when viewed from in the first direction.

5. The electronic device of claim 1, further comprising:
a processor; and
a memory operatively connected to the processor, wherein the memory stores one or more instructions that when executed, cause the processor to:
transmit a positioning message to a positioning target by using the first antenna element and the second antenna element;
receive a first response signal regarding the positioning message by using the first antenna element and receive a second response signal regarding the positioning message by using the second antenna element; and
identify, based on the first response signal and the second response signal, a phase difference between the first response signal and the second response signal received using the second antenna element, and identify a receiving angle of the first response signal and the second response signal.

6. The electronic device of claim 5, wherein the one or more instructions, when executed, cause the processor to:
measure a distance to the positioning target based on the phase difference between the first response signal and the second response signal, the receiving angle of the first response signal and the response second signal, and the first distance.

7. The electronic device of claim 5, wherein the one or more instructions, when executed, cause the processor to:
measure an Angle of Arrival (AoA) with respect to the positioning target based on the phase difference between the first response signal and the second response signal, and the receiving angle of the first response signal and the response second signal, and the first distance.

8. The electronic device of claim 1, wherein:
the first auxiliary radiator is disposed on at least one surface of a stack structure disposed to be spaced apart from the first antenna element in the first direction, and
the stack structure comprises at least one of a non-conductive member, a sponge, or a polycarbonate (PC) film.

9. The electronic device of claim 1, wherein the first auxiliary radiator corresponds to a conductive pattern formed on at least one surface of a stack structure disposed to be spaced apart from the first antenna element in the first direction, and
wherein the at least one surface of the stack structure is:
at least one of:
a first surface between a glass and a polymer plate of the stack structure,
a second surface facing the second direction on the polymer plate,
a third surface facing the first direction on a sponge, of the stack structure or
a fourth surface facing the second direction on the sponge.

10. The electronic device of claim 9,
wherein the conductive pattern is formed on one surface facing the first direction on a polycarbonate (PC) film included in the stack structure and disposed to be spaced apart in the second direction from a non-conductive member.

11. The electronic device of claim 4, wherein:
the second auxiliary radiator and the third auxiliary radiator are respectively disposed on at least one surface of components included in a stack structure and the components included in the stack structure are disposed to be spaced apart in the first direction from the second antenna element and the third antenna element and
the stack structure comprises at least one of a non-conductive member, a sponge, or a polycarbonate (PC) film.

* * * * *